United States Patent [19]
Ooka

[11] Patent Number: 5,432,654
[45] Date of Patent: Jul. 11, 1995

[54] APPARATUS HAVING A PLURAL CASSETTE CARRYING TRAY, A HEAD DRUM COLLISION PREVENTING GUIDE MEMBER, AND A POP-UP MECHANISM ARRANGEMENT

[75] Inventor: Satoshi Ooka, Fukaya, Japan

[73] Assignee: Kabushiki Kaisha Toshiba, Kawasaki, Japan

[21] Appl. No.: 232,440

[22] Filed: Apr. 21, 1994

Related U.S. Application Data

[63] Continuation of Ser. No. 831,369, Feb. 4, 1992, abandoned.

[30] Foreign Application Priority Data

Feb. 4, 1991 [JP] Japan ................... 3-035674

[51] Int. Cl.⁶ ............... G11B 15/68; G11B 15/675
[52] U.S. Cl. .................... 360/92; 360/96.5; 360/96.6; 242/337
[58] Field of Search .......... 360/92, 96.5, 96.6, 360/98.04, 98.05, 98.06; 369/34–39, 178, 191; 242/337.1, 337

[56] References Cited

U.S. PATENT DOCUMENTS

| | | | |
|---|---|---|---|
| 4,799,117 | 1/1989 | Ohyama | 360/96.5 |
| 4,903,152 | 2/1990 | Matsui | 360/92 |
| 4,933,789 | 6/1990 | Ikeda | 360/96.5 |
| 5,018,030 | 5/1991 | Ohashi | 360/94 |

FOREIGN PATENT DOCUMENTS

| | | | |
|---|---|---|---|
| 0177133 | 4/1986 | European Pat. Off. | |
| 0389199 | 9/1990 | European Pat. Off. | |
| 2562305 | 10/1985 | France | |
| 61-126662 | 6/1986 | Japan | 360/92 |
| 62-134852 | 6/1987 | Japan | 360/92 |
| 2-118951 | 5/1990 | Japan | |
| 2-126461 | 5/1990 | Japan | |

*Primary Examiner*—Stuart S. Levy
*Assistant Examiner*—Craig A. Renner
*Attorney, Agent, or Firm*—Cushman Darby & Cushman

[57] ABSTRACT

An apparatus includes a housing which incorporates a recording and reproducing function which includes a tape diving section, an opening portion formed in a front wall of the housing, and a tray unit which can be horizontally inserted and removed through the opening portion and in which first and second cassettes can be arranged on top surfaces of front and back regions, respectively. A cassette driving unit including pantagraph mechanisms and, a motor for driving the tray, and gears to move the tray unit and selectively load one of the cassettes in the tape driving section. Pop-up mechanisms and provided in the front and back regions of the tray, respectively. When the tray unit is pulled and the entire front region and a portion of the back region are located outside said housing, the pop-up mechanisms lift the front end of the cassette loaded in the back region to direct it toward an obliquely upper position.

14 Claims, 9 Drawing Sheets

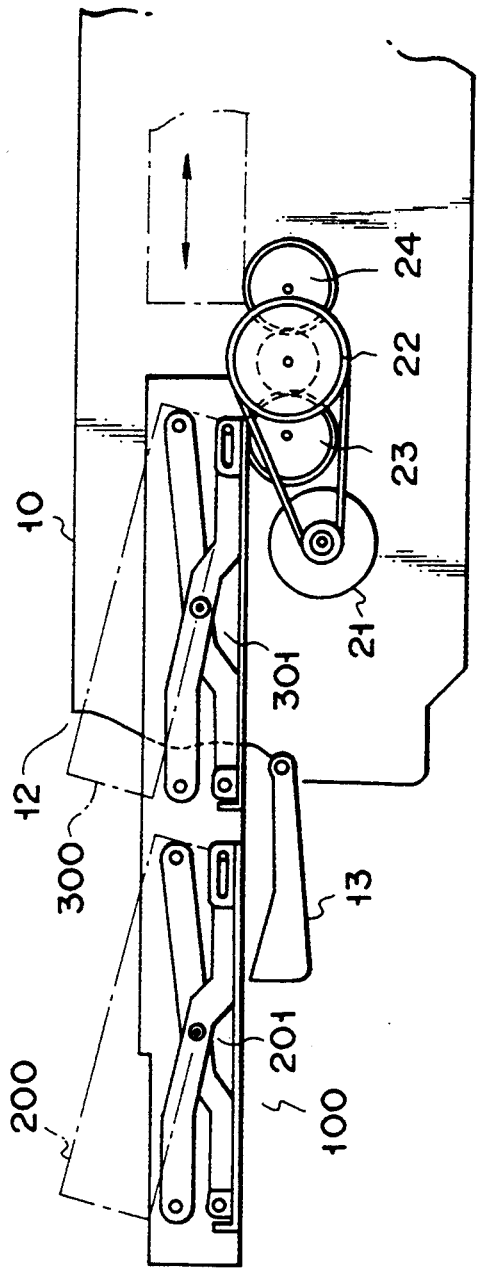
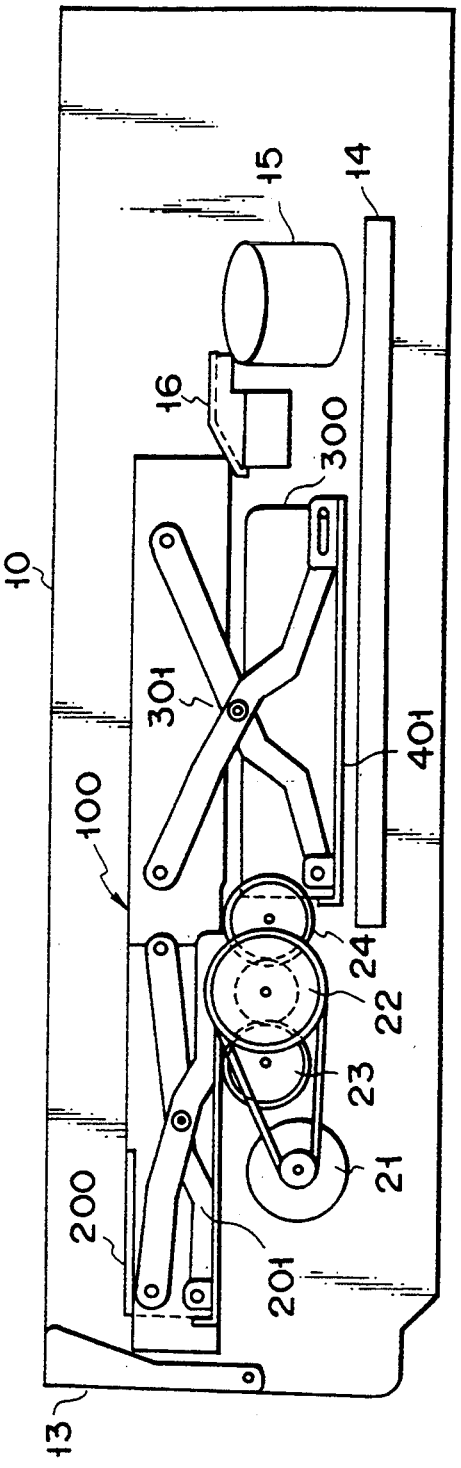
FIG. 1A
FIG. 1B

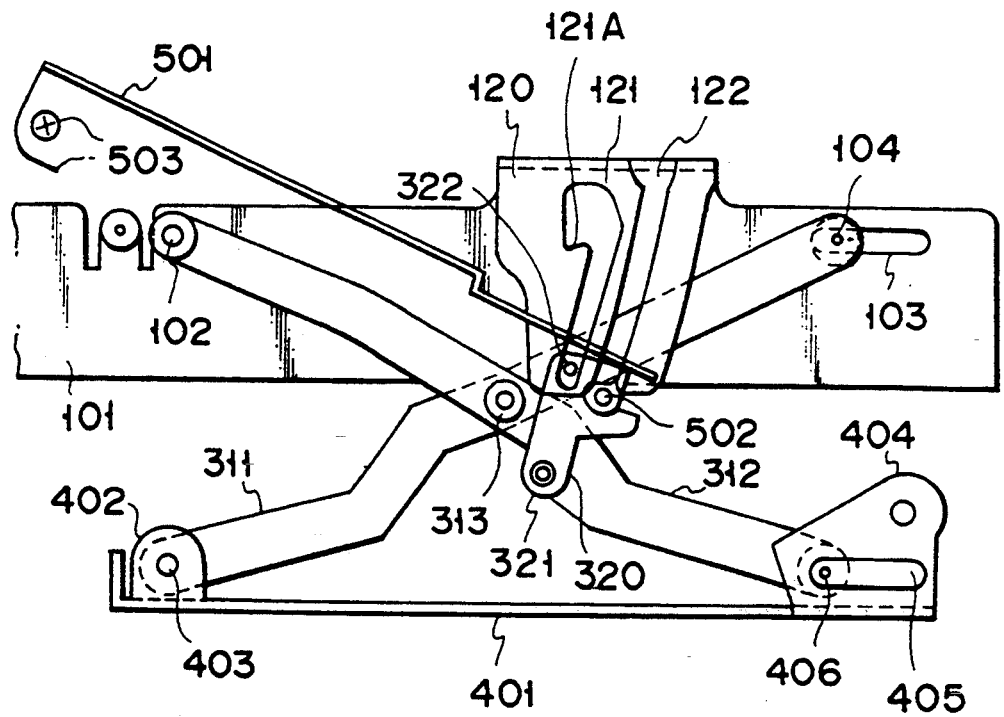
F I G. 2A
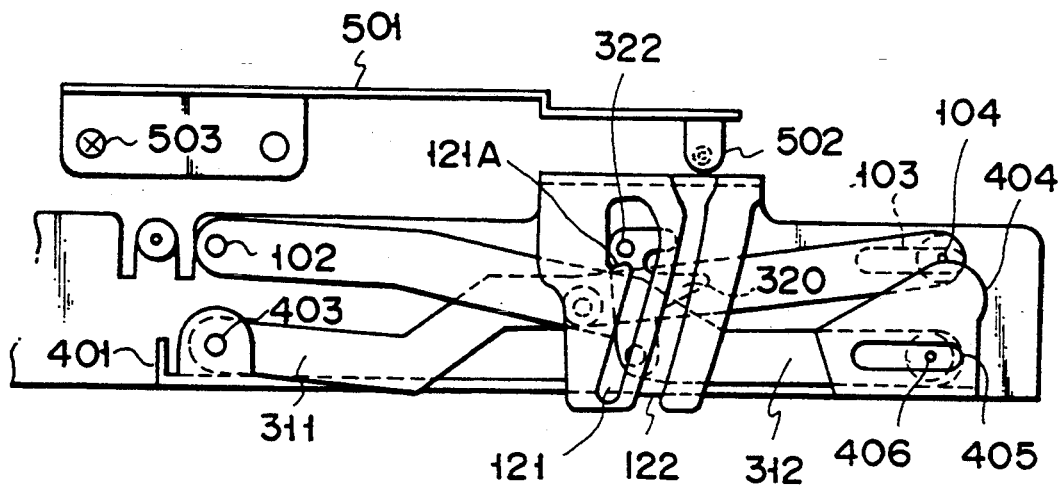
F I G. 2B

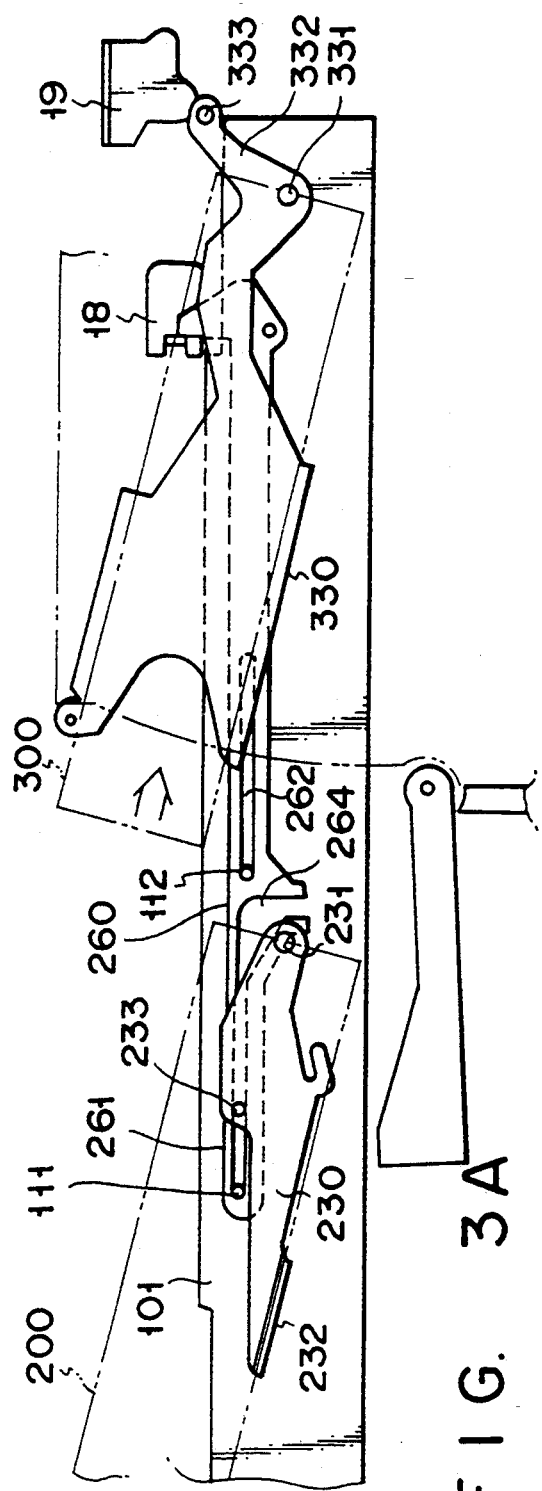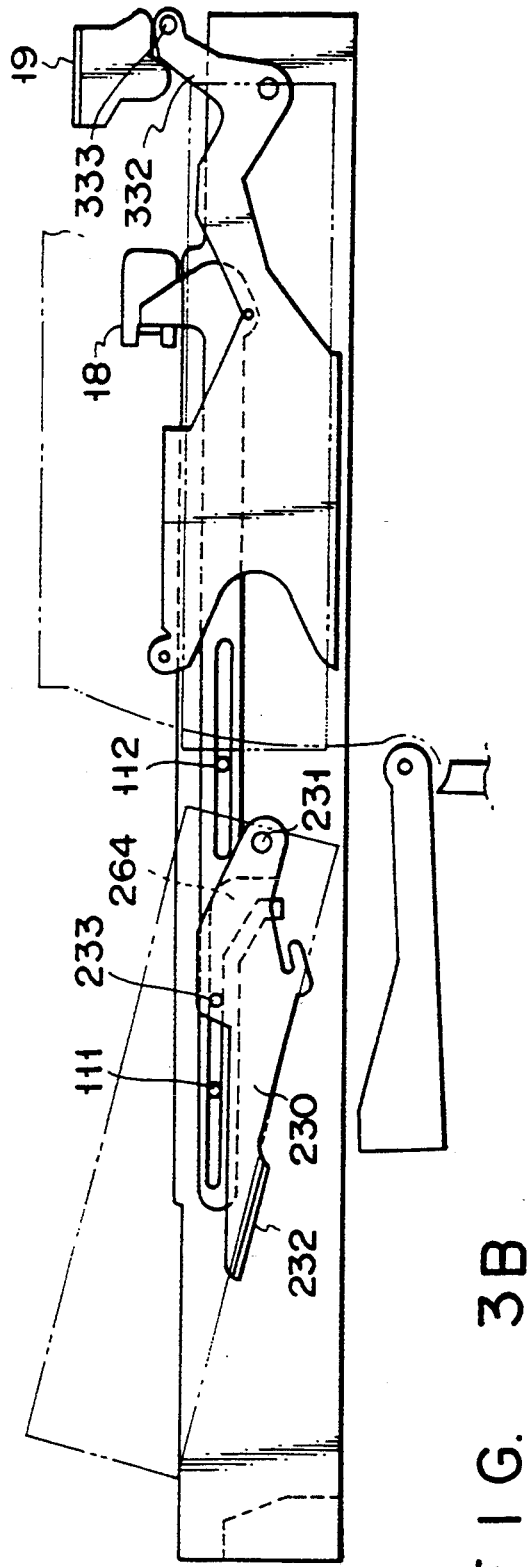

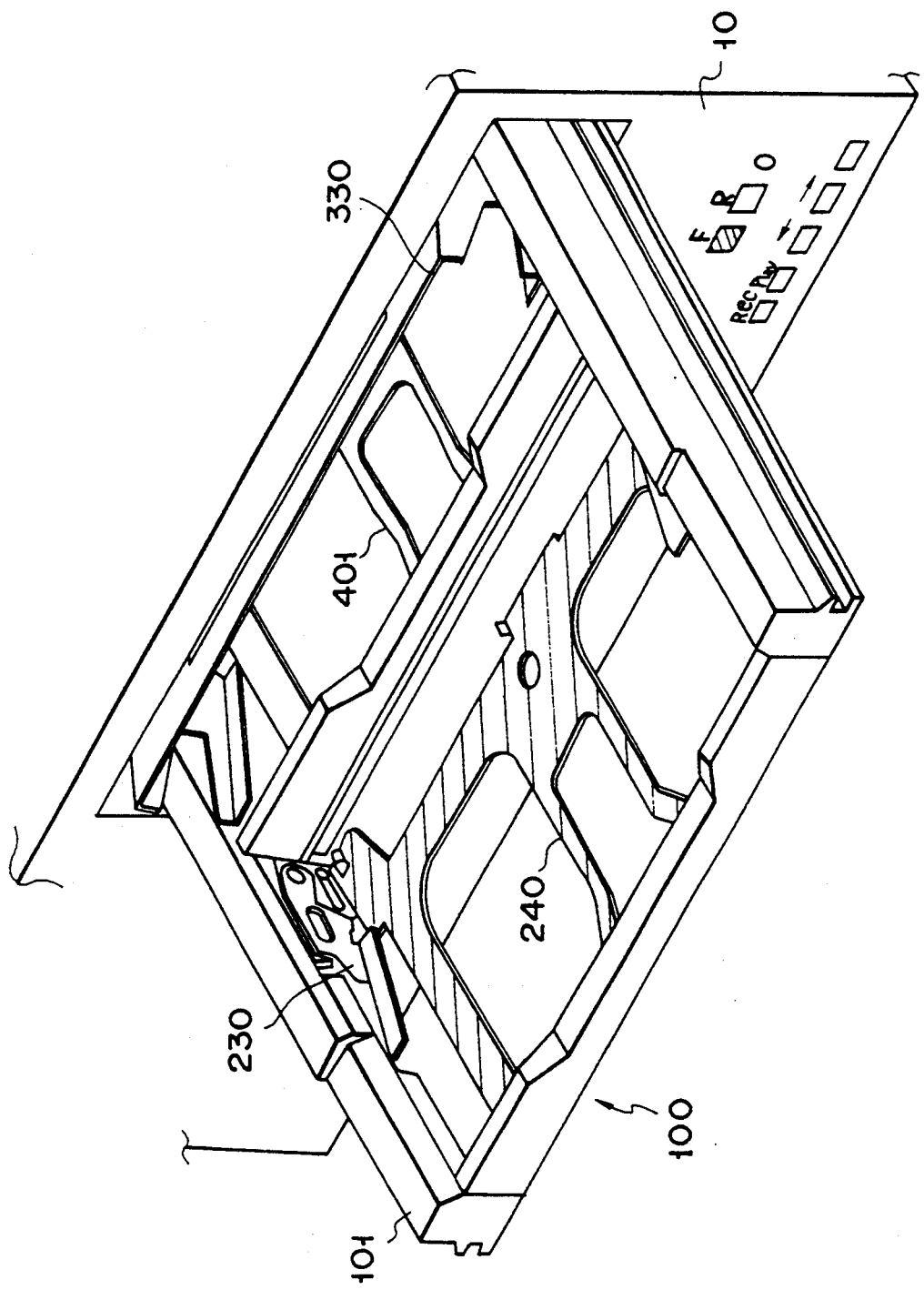

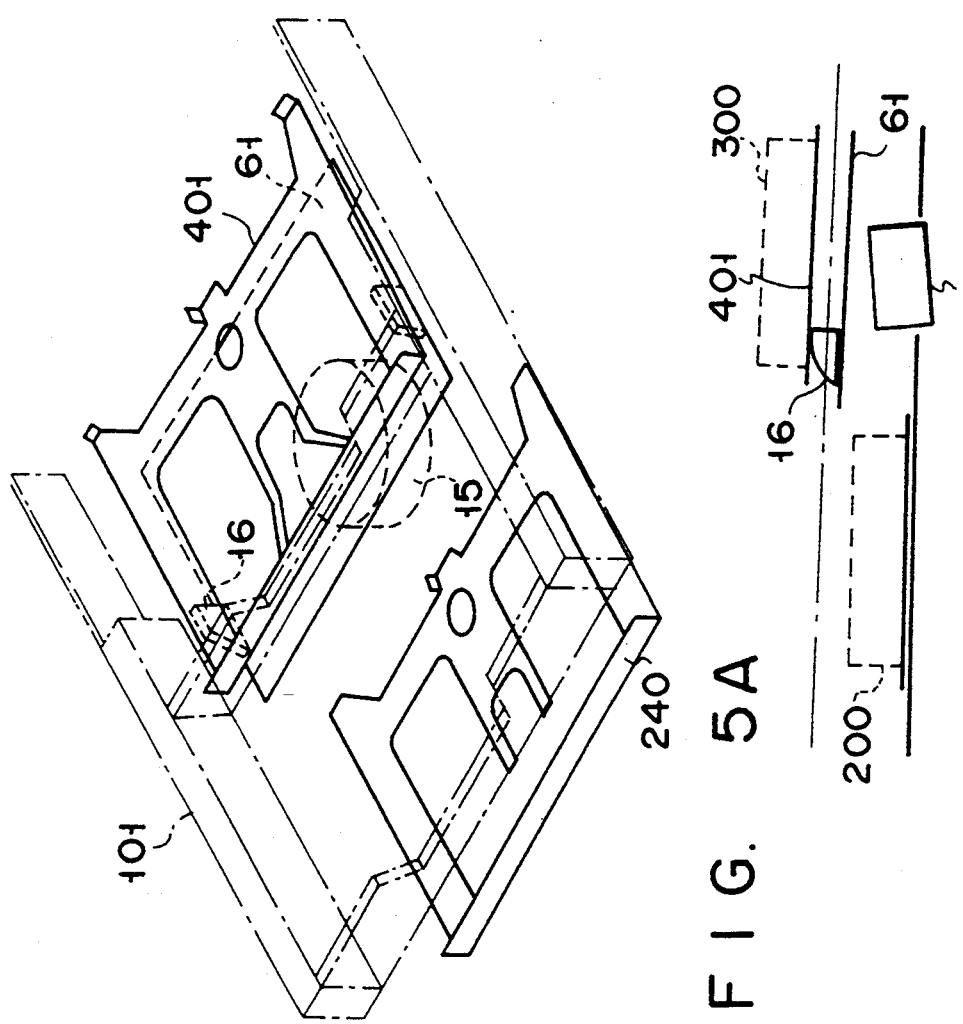

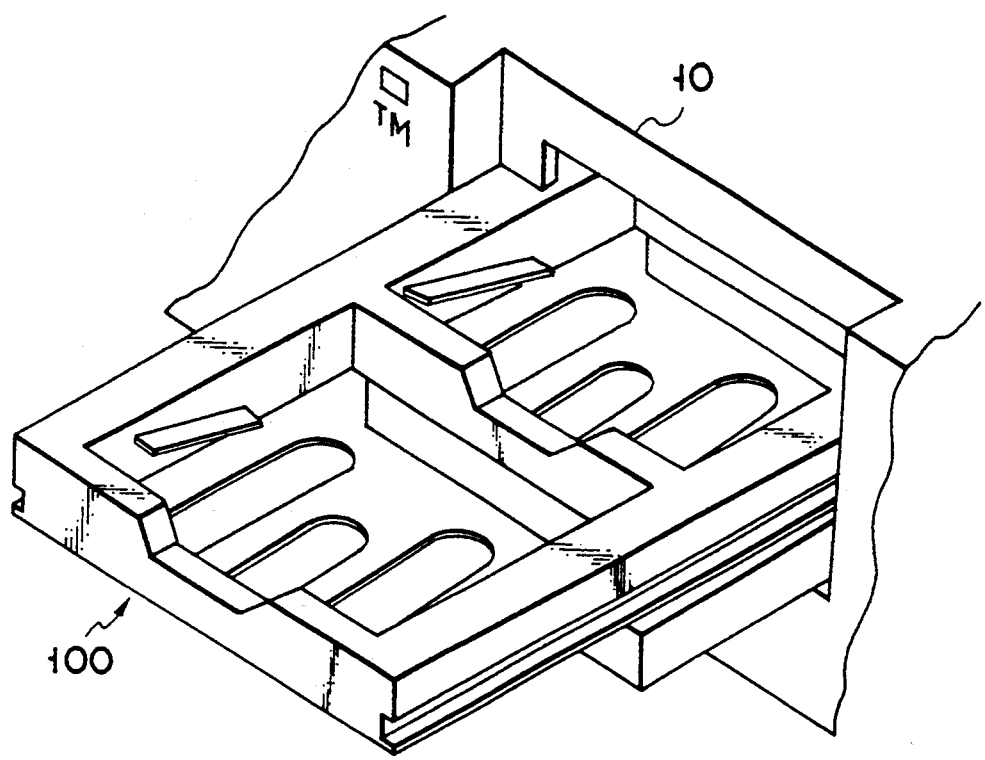
F I G. 6A
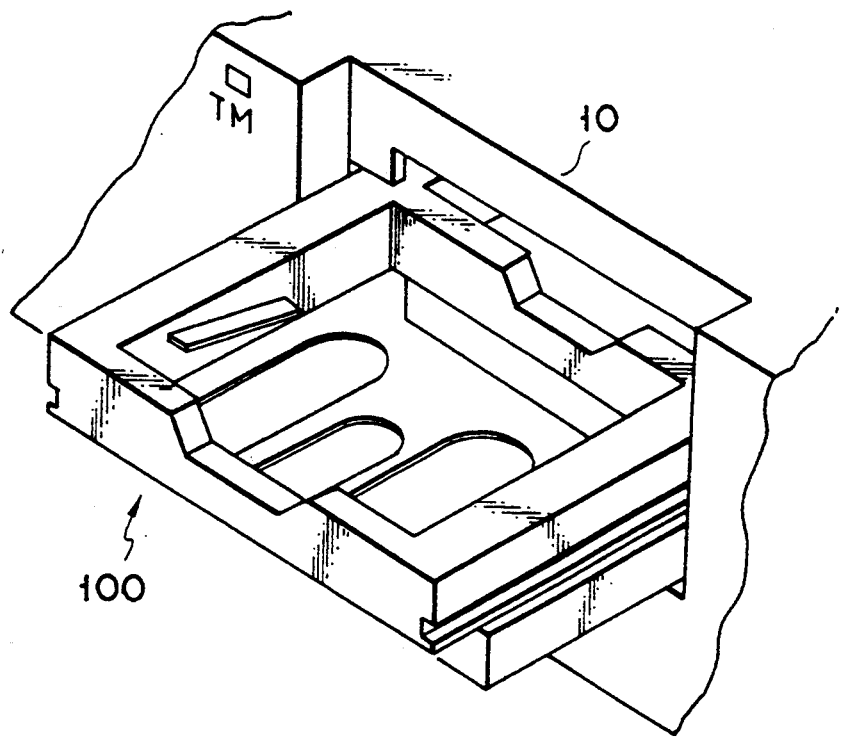
F I G. 6B ically are being changed to a mode capable of performing timer

APPARATUS HAVING A PLURAL CASSETTE CARRYING TRAY, A HEAD DRUM COLLISION PREVENTING GUIDE MEMBER, AND A POP-UP MECHANISM ARRANGEMENT

This is a continuation of application Ser. No. 07/831,369, filed on Feb. 4, 1992 now abandoned.

BACKGROUND OF THE INVENTION

1. Field of the Invention

The present invention relates to an apparatus for use in, e.g., a video tape recorder (to be referred to as a VTR hereinafter) or a digital audio disk tape recorder (DAT) and, more particularly, to an apparatus for handling a plurality of cassettes.

2. Description of the Related Art

Recently, long TV programs have been increased in number, and the number of midnight broadcast TV programs has been increased after the start of satellite broadcasting. Therefore, the recording mode of VTRs is being changed to a mode capable of performing timer or unattended recording or long-time recording.

Existing VTRs, however, can load only one tape cassette, and a recording capacity achieved without replacing a tape cassette is limited. In addition, the dimensional standard of cassettes brings about limitations in the formation of large-capacity cassette tapes. If a VTR is so constituted as to load a plurality of cassettes in order to solve the above problems, the size of the VTR itself tends to increase, and this increases the space occupied by the VTR. In addition, the operability of the VTR tends to deteriorate. For this reason, a demand has arisen for improvements in these problems.

SUMMARY OF THE INVENTION

It is, therefore, an object of the present invention to obtain an apparatus which can load a plurality of cassettes and to provide an apparatus for handling a plurality of cassettes, which can selectively load a cassette in a cassette driving section.

In order to achieve the above object, the present invention comprises a housing which incorporates a recording and reproducing unit including a tape driving section, an opening portion formed in a front wall of the housing, a carrying unit which can be horizontally inserted in or removed from the opening portion and in which a plurality of cassettes can be arranged through the opening portion, and a cassette driving unit for moving the carrying unit to selectively transport one of the plurality of cassettes to a position corresponding to the tape driving section and transporting the cassette to the tape driving section.

As described above, the cassette driving unit can selectively transport one of a plurality of cassettes mounted in the carrying unit by controlling the movement of the carrying unit.

It is another object of the present invention to provide a cassette loading apparatus which can facilitate, when a plurality of cassettes are to be handled, handling of the cassettes and the operation of the apparatus without increasing the space occupied by the apparatus.

In order to achieve the above object, the present invention comprises a tray which can be horizontally inserted and removed through the opening portion and in which first and second cassettes can be arranged on top surfaces of front and back regions, respectively, and a rear pop-up mechanism, arranged in the back region of the tray, for lifting a front end of the second cassette loaded in the back region to direct the front end toward an obliquely upper position when the tray is extracted and the entire front region and a portion of the rear region are located outside the housing.

Since the tray moving range is set as described above, only a small operation space is required around the apparatus main body. In addition, the cassette in the back region is lifted at its front end portion by the rear pop-up mechanism. Therefore, the cassette in the back region can be independently loaded and unloaded.

BRIEF DESCRIPTION OF THE DRAWINGS

FIGS. 1A, 1B, and 1C are views for explaining the basic arrangement of an apparatus according to an embodiment of the present invention in its first, second, and third operation modes, respectively;

FIGS. 2A, 2B, and 2C are views for explaining a pantagraph mechanism and its driving mechanism according to the embodiment of the present invention;

FIGS. 3A and 3B are views for explaining a pop-up mechanism and its operation according to the embodiment of the present invention;

FIG. 4 is a perspective view showing a tray unit and its operation mode;

FIGS. 5A and 5B are views for explaining a rear cassette retraction position according to the embodiment of the present invention.;

FIGS. 6A and 6B are views for explaining the use examples of the tray unit according to the embodiment of the present invention.

DETAILED DESCRIPTION OF THE PREFERRED EMBODIMENTS

Embodiments of the present invention will be described below with reference to the accompanying drawings.

Figure 1C:
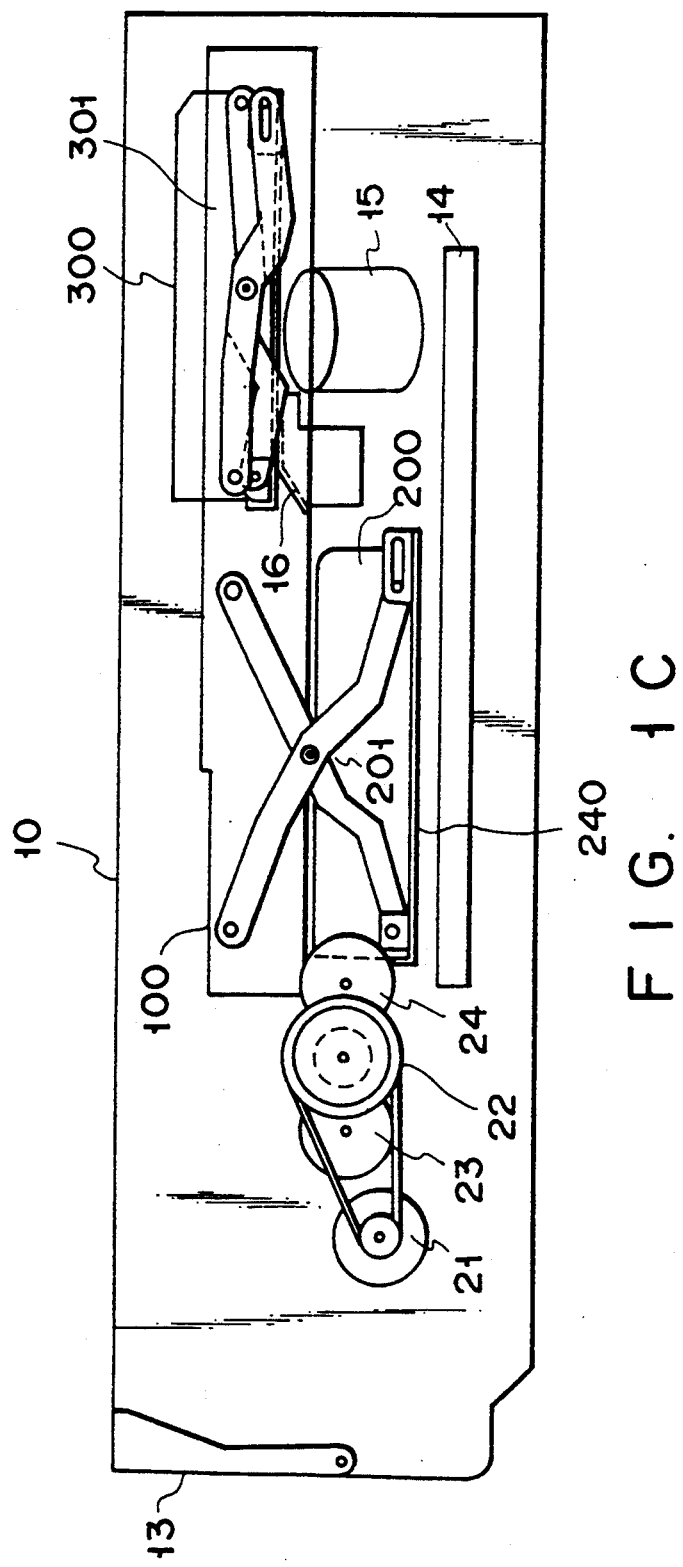

FIGS. 1A, 1B, and 1C are views for explaining the basic arrangement for cassette loading and unloading of a VTR to which the present invention is applied. Reference numeral 10 denotes a VTR housing having an opening 12 formed in its front wall. A tray unit 100 can be horizontally inserted forward and backward or exposed from the inside of the housing 10 through this opening 12. Note that reference numeral 13 denotes a cover provided on the opening 12. The cover 13 is opened when the tray unit 100 is pulled out from the casing 10 and is closed after the tray unit 100 is inserted into the housing 10. This is accomplished by, although not shown, a cover opening/closing mechanism interlocked with the tray unit 100.

A motor 21 is provided as a tray driving mechanism (which indirectly functions as a cassette driving mechanism) at a fixed position in the housing 10. The motor 21 can rotate an intermediate gear 22. The intermediate gear 22 has a rotating shaft perpendicular to the back-and-forth moving direction of the tray unit 100 and thereby can rotate driving gears 23 and 24 located before and after the intermediate gear 22. The driving gears 23 and 24 mesh with a rack provided on the lower surface of a side portion of the tray unit 100 to drive the tray unit 100 back and forth. This VTR further incorporates a tape driving section. That is, the VTR has a function of loading a cassette at a predetermined position to execute tape loading. Reference numeral 14 denotes a main chassis containing reel shafts to be engaged with reel hubs of a cassette and various parts (not shown) required to perform tape loading and tape driving; and 15, a rotary head drum with which a tape extracted from a cassette arranged in a predetermined loading position is brought into contact.

FIG. 1A shows a state in which the front driving gear 23 meshes with the rack, FIG. 1B shows a state in which both the front and back driving gears 23 and 24 mesh with the rack, and FIG. 1C shows a state in which the back driving gear 24 meshes with the rack.

The tray unit 100 has a tray frame which has a frame-like shape when viewed from the above, and rails outside the side plates of the tray frame are guided by rollers provided inside the housing 10 to make it possible to move the frame horizontally.

In this system, two cassettes 200 and 300 can be arranged in front and back regions on the top surface of the tray unit 100 (FIG. 1A). Pantagraph mechanisms 201 and 301 are mounted on the front and back regions of the tray unit 100, respectively. The pantagraph mechanisms 201 and 301 have the same structure and each can move a cassette bottom support plate upward and downward by means of a link mechanism. These pantagraph mechanisms 201 and 301 constitute a part of the cassette driving mechanism.

FIG. 1A shows a state in which the cassettes 200 and 300 are placed on the front and back regions, respectively. The reason why each of the cassettes 200 and 300 directs its front end portion toward an obliquely upper position because this front end portion is lifted by a pop-up mechanism provided in the tray unit 100 to facilitate loading and unloading of the cassette. In addition, the rear cassette 300 can be removed without pulling out the tray unit 100 largely from the opening of the housing 10. That is, the front cassette 200 is entirely exposed, whereas only a portion (distal end portion) of the rear cassette 300 is exposed from the opening with this design, the tray unit 100 need only be pulled by a short distance, and this decreases the surrounding space occupied by the system for handling it.

FIG. 1B shows a state in which the rear pantagraph mechanism 301 loads the cassette 300 in a tape loading position below a portion where the tray passes. FIG. 1C shows a state in which the front pantagraph mechanism 201 moves the cassette 200 downward to load it in a predetermined tape loading position. To transit from the state shown in FIG. 1A to the state shown in FIG. 1B, the tray driving mechanism operates to horizontally move the tray unit 100 inside the housing 10. Upon arriving at a first detection position (rear cassette driving position), the tray unit 100 is stopped. At this position, a pantagraph driving mechanism (to be described later) operates to drive the pantagraph mechanism 301, thereby moving the cassette 300 downward. To transit from the state shown in FIG. 1B to the state shown in FIG. 1C, the pantagraph driving mechanism drives the pantagraph mechanism so as to lift the cassette 300 from the lower position and return it to its original position in the tray unit 100. Subsequently, the tray driving mechanism further moves the tray unit 100 inward and stops the movement of the tray unit 100 when the tray unit 100 reaches a position above a cassette loading position, i.e., a second detection position (front cassette driving position). Again, the pantagraph drive mechanism drives this time the pantagraph mechanism 201 to move the cassette 200 down to a predetermined position.

In the state shown in FIG. 1C, the pantagraph mechanism 301 which mounts the rear cassette 300 is located immediately above the rotary head drum 15. At this position, the pantagraph mechanism 301 is guided in a direction along which it is floated slightly from the tray unit 100, thereby preventing collision of the cassette 300 and the pantagraph mechanism 301 against the rotary head drum 15. A member which lifts the pantagraph mechanism 301 is a guide member 16 projecting from the inner side surface of the housing 10. That is, when the tray unit 100 further moves inward from the state shown in FIG. 1A with the cassette 300 being lifted, the bottom plate of the pantagraph mechanism 301 rides on the inclined surface of the guide member 16. The cassette 300 or the pantagraph mechanism is lifted slightly at the standby position of the cassette 300 because if the height of the housing 100 is decreased for a low-profile arrangement, the locus of movement of the tray unit 100 crosses the upper portion of the rotary head drum 15. This arrangement also reduces a temperature rise by improving ventilation around the rotary head drum 15 and improves the safety of a cassette tape.

As can be seen from FIGS. 1B and 1C, the system is designed such that when one of cassettes is located at a position from which it can be transported to the tape driving section, the other cassette is present inside the housing 10. Therefore, at least a length corresponding to three cassette tapes are required in the front-and-back direction inside the housing 10. That is, a space substantially corresponding to the front-and-back width of one cassette is present between the tray unit 100 and the inner surface of the front wall of the housing 10 when the tray unit 100 is in the position shown in FIG. 1C, and between the tray unit 100 and the inner surface of the rear wall of the housing 10 when the tray unit 100 is in the position shown in FIG. 1B.

From the comparison between the states shown in FIGS. 1A and 1C, it is understood that this system is designed as follows. That is, the tray unit 100 is pulled out most in the state of FIG. 1A and is inserted deepest in the state of FIG. 1C. A rack provided on the edge of the lower surface of the tray unit 100 meshes with the gears 23 and 24 to move the tray unit 100 back and forth. In this case, the two gears 23 and 24 are aligned along the moving direction of the tray and interlocked through the intermediate gear 22 such that only the gear 23 meshes with the rack in the state shown in FIG. 1A, whereas only the gear 24 meshes with it in the state shown in FIG. 1C. With this arrangement of the gears 23 and 24, it is possible to decrease the total length of the tray unit 100 in the front-and-back direction. If it is attempted to realize the driving gear mechanism of the tray unit 100 with only a single gear, the total length of the tray unit 100 becomes inevitably larger than that in this embodiment since the single gear must mesh with the rack in both the states of FIGS. 1A and 1C.

Therefore, the tray unit 100 need only have a length corresponding to the sum of the size of a cassette and the frame size of the tray frame in the front-and-back direction. As a result, the space in the front-and-back direction inside the housing 10 can be reduced to almost the size of three cassettes, a minimum necessary size.

This miniaturization of the tray unit 100 in its total length reduces the load on the driving unit by decreasing the weight of the tray unit. This small total length also narrows the space into which the tray unit 100 projects upon cassette loading and in this way decreases the surrounding space occupied by the system. In other words, the stroke of movement of the tray unit 100 can be increased even with the small total length of the tray unit.

Figure 2C:
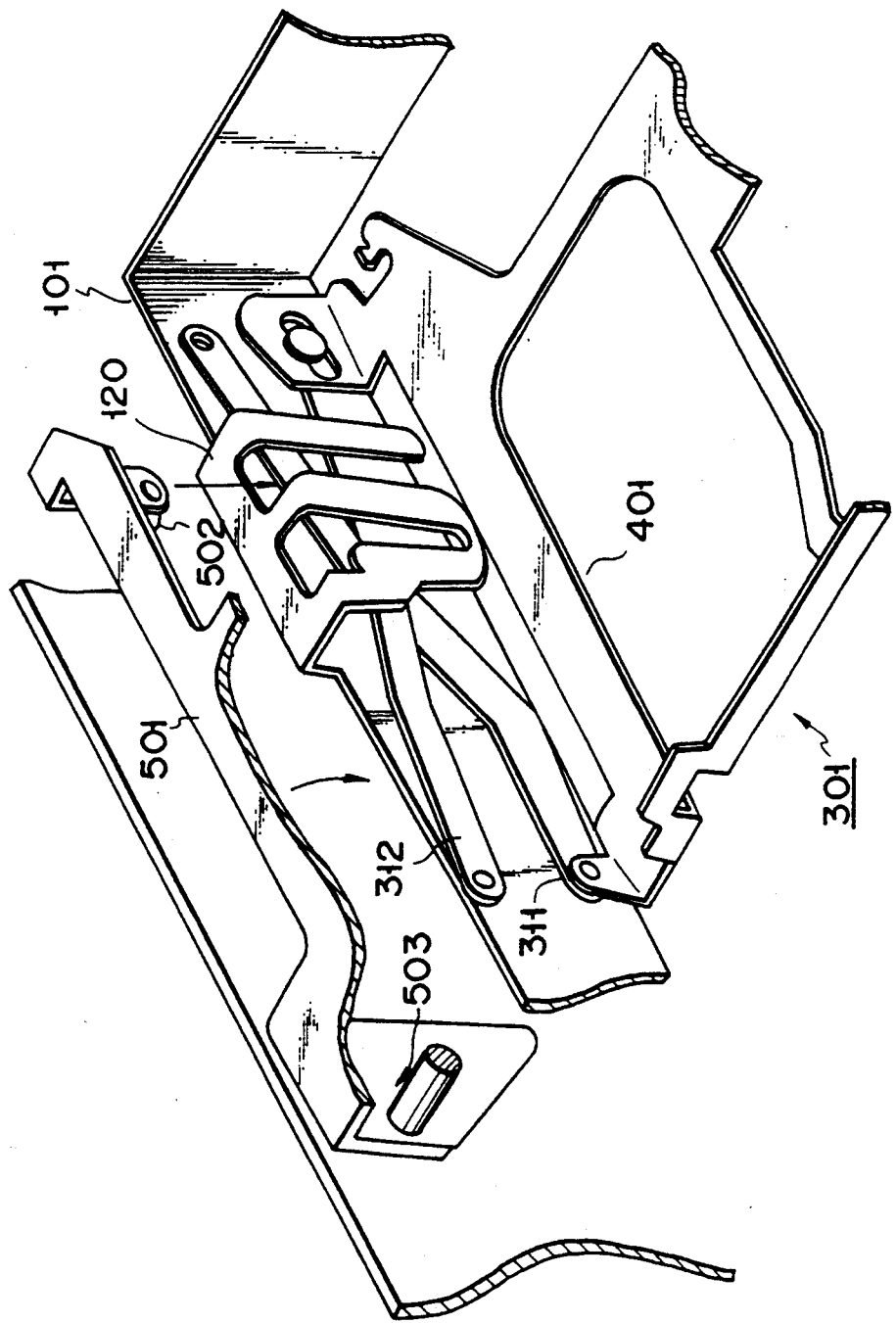

FIGS. 2A, 2B, and 2C show the pantagraph mechanism 301 together with its pantagraph driving mechanism.

Although various modifications of the pantagraph mechanism 301 are possible, the pantagraph mechanism 301 of this apparatus has a basic arrangement in which first and second link levers 311 and 312 are arranged to cross each other like an x mark when viewed from the side surface. The crossing portions of the link levers 311 and 312 are coupled by a shaft 313. This enables the link levers 311 and 312 to move their respective two end portions apart from (rise) or close to (fall) each other as shown in FIGS. 2A and 2B, respectively. The front end portions of the link levers 312 and 311 are pivotally mounted on a frame 101 of the tray unit 100 and on a mounting portion 402 of a cassette bottom support plate 401 through shafts 102 and 403, respectively. The rear end portion of the link lever 311 is engaged with an elongated hole 103 formed in the frame 101 through a pin 104. The rear end portion of the link lever 312 is engaged with an elongated hole 405 formed in a mounting portion 404 of the cassette bottom support plate 401 through a pin 406. With this arrangement, the link mechanism can move the cassette bottom support plate 401 to the upper or lower position.

The pantagraph driving mechanism for driving the pantagraph mechanism 301 will be described below.

The pantagraph driving mechanism has a pivotal part 501 for pushing down or pulling up an intermediate cam 320 which is pivotally provided on the link lever 312. The intermediate cam 320 is pivotally mounted in the middle of the link lever 312 by a shaft 321 and moves upward and downward in accordance with the movement of the link lever 312. In this case, an engagement pin 322 is provided in the intermediate cam 320. This engagement pin 322 engages with a hole 121 of a guide plate 120 attached to the frame 101 at a predetermined interval therebetween. This hole 121 is like a groove and has a locking function for locking the rise position of the pantagraph mechanism and a regulating function for regulating the locus of upward and downward movements of the pantagraph mechanism and the lower position of the mechanism. That is, since the engagement pin 322 of the intermediate cam 320 moves along the hole 121, the locus upon upward and downward movements is regulated, and the lower position is determined by the lower end portion of the hole 121. Upon rising, the engagement pin 322 engages with a locking portion 121A formed as a stepwise recess in the hole 121 to prevent an unexpected downward movement of the pantagraph mechanism.

A guide groove 122 is further formed in the guide plate 120 in parallel with the hole 121. This guide groove 122 is so formed as to notch the guide plate 120 at its upper and lower end portions. The pivotal distal end of the intermediate cam 320 is located to overlap and cross the guide groove 122. Since the guide groove 122 is cut away in the vertical direction, a roller 502 provided at the distal end of the pivotal part 501 can pass through this groove. The roller 502 faces the guide groove 122 from the above on the drawing surface.

The pivotal part 501 is pivotally mounted by a shaft 503 at a fixed position (above the path through which the tray unit 100 passes) inside the housing, and its pivotal distal end can move upward and downward along the guide groove 122. FIG. 2B shows a state before the pantagraph driving mechanism operates, in which the roller 502 is located in an upper portion of the entrance of the guide groove 122. When position detecting means of the tray unit 100 generates position detection information, the pivotal part 501 is driven to pivot about the shaft 503 by driving means (not shown). In this state, the roller 502 enters the guide groove 122. When the roller 502 abuts against the pivotal end portion of the intermediate cam 320, the intermediate cam 320 slightly pivots clockwise. For this reason, the engagement pin 322 of the intermediate cam 320 can move away from the locking portion 121A and downward along the hole 121. Therefore, the pivotal part 501 continuously pivots to the state shown in FIG. 2A. With this pivotal motion, the cassette bottom support plate 401 supported by the pantagraph mechanism moves downward to load a cassette in a predetermined loading position. At this time, the position of the engagement pin 322 of the intermediate cam 320 is regulated by the hole 121, and this consequently determines the position the cassette. At the same time, the roller 502 of the pivotal part 501 engages with the U-shaped groove of the intermediate cam 320. Therefore, the pantagraph mechanism is locked at that position. In addition, an elastic holding member which rotates with the shaft 503 of the pivotal member 501 holds the right and left central portions of the cassette from the above.

FIG. 2A shows a state in which the cassette bottom support plate 401 is at its lower position. In order to transit from this lower position to an upper position, the pivotal part 501 is pivoted counterclockwise by a driving means (not shown). Since the roller 502 engages with the U-shaped recess of the intermediate cam 320, it pulls up the intermediate cam 320. With this movement, the link mechanism operates to raise the cassette bottom support plate 401. Immediately before the intermediate cam 320 is set in the state shown in FIG. 2B, the roller 502 pushes the intermediate cam 320 counterclockwise. As a result, the engagement pin 322 of the intermediate cam 320 moves to the locking portion 121A. Therefore, when the cassette bottom support plate 401 rises to the same level as the tray unit 100, the link mechanism does not unexpectedly move down.

FIGS. 2A, 2B, and 2C illustrate the pantagraph mechanism and its driving mechanism on the left side from the opening. However, the similar mechanisms are provided also on the right side, and these left and right mechanisms operate in synchronism with each other.

FIGS. 3A and 3B show the pop-up mechanism for facilitating handling of the cassette 200 or 300 from outside when the tray unit 100 is pulled out from the housing 10. When the tray unit 100 is pulled out from the housing 10, the front and rear cassettes 200 and 300 are set parallel with each other by the pop-up mechanism with their front ends being inclined upward. The arrangement is designed such that the rear cassette 300 is inserted in a pop-up member 330 in the back region with its bottom surface sliding on the top surface of the front cassette 200.

FIG. 3A shows a state in which a pop-up member 230 in the front region and the rear pop-up member 330 lift the respective cassettes 200 and 300.

The front pop-up mechanism will be described below.

The pop-up member 230 has a shaft 231 about which the front-side pivotal end freely pivots in the vertical direction. A support portion 232 is formed at the front-side pivotal end. This support portion 232 can lift the bottom portion of the cassette 200. Although not shown, the shaft 231 is mounted on the left side plate of the left and right side plates of the cassette bottom support plate. Therefore, when the cassette bottom support plate 240 is moved down by the pantagraph mechanism 201 as shown in FIG. 1C, the shaft 231 can move down together with the plate 240.

A slider 260 is arranged on the inner wall of the frame 101. The slider 260 can move with respect to the frame 101 in the same direction as the moving direction of the frame 101. Elongated holes 261 and 262 of the slider 260 engage with pins 111 and 112 projecting from the inner wall of the frame 101. The slider 260 also has a notched portion 264 at a position corresponding to the pop-up member 230. This notched portion 264 communicates with the elongated hole 261 and has an inclined portion. It is possible through this notched portion 264 to insert a pin 233 mounted on the pop-up member 230 into the elongated hole 261. This is required to move the pop-up member 230 downward together with the cassette bottom support plate 240 when the plate 240 is moved down to the position shown in FIG. 1C and to return the member 230 to its original position.

When the tray unit 100 is inserted into the housing 10, the state is changed from FIG. 3A to 3B, and the front cassette 200 is set parallel to the tray unit 100 by the pivotal motion of the pop-up member 230. That is, when the tray unit 100 further moves inward from the state shown in FIG. 3B, the pins 111 and 112 and the pop-up member 230 together move backward (relatively, the slider 260 moves forward). Therefore, the pin 233 abuts against the corner of the notched portion 264, i.e., there is no portion for supporting the pin 233 from below. In this state, the slider 260 and the frame 101 move together backward. Since the pop-up member 230 has the notched portion 264 (which is connected to the end portion of the elongated hole 261 and has an L shape to open downward), its pivotal distal end pivots downward to place the cassette 200 on the cassette bottom support plate 240.

Conversely, when the tray unit 100 is pulled out from inside, the frame 101, the slider 260, and the pop-up member 230 move together forward. During this movement, however, the slider 260 is stopped by a stopper 18 provided at a fixed position inside the housing and therefore no longer moves forward. When the frame 101 further moves forward from this state, the slider 260 relatively moves backward, and the pin 233 of the pop-up member 230 is guided by the inclined portion of the notched portion 264 to enter the elongated hole 261. This operation directs the pivotal distal end of the pop-up member 230 upward, and the result is the state shown in FIGS. 3A and 3B.

The pop-up mechanism for driving the rear pop-up member 330 and the operation of the mechanism will be described below.

The pop-up member 330 has an opening through which the cassette 300 can be inserted from the front side. The back portion of the pop-up member 330 is pivotally supported by a shaft 331 so that the front portion of the member can pivot vertically. Although not shown, the shaft 331 is mounted on the left side plate of left and right side plates of the cassette bottom support plate. Therefore, when the cassette bottom support plate 401 moves down as shown in FIGS. 1B and 2A, the pop-up member 330 can move down or up together with the plate 401. The pivotal distal end of the pop-up member 330 faces upward in FIG. 3A and is parallel to the cassette bottom support plate in FIG. 3B. This is so because a distal end portion 333 of a lever 332 formed at the rear end portion of the pop-up member 330 is pivoted by a projecting portion 19 provided at a fixed position. That is, when the tray unit 100 is pulled out most, the pop-up member 330 is pivoted clockwise about the shaft 331 by the projecting member 19. When the tray unit 100 moves backward, the distal end portion 333 of the lever 332 is separated from the projecting portion 19. Therefore, the pop-up member 330 is pivoted counterclockwise to be parallel to the cassette bottom support plate by its own weight or a weak spring.

In this case, the pivotal distal end portion of the pop-up member 330 can be further pivoted upward about the shaft 331. The range of this pivotal motion is an allowable range of the upper edge of the opening portion of the housing. The reason why the pop-up member 330 can be pivoted with its distal end facing upward is that when the cassette 300 is to be removed in the state shown in FIG. 3A, the gap between the cassettes 200 and 300 can be slightly increased to facilitate insertion of fingers.

The operation timings of the front pop-up mechanism constituted by the pop-up member 230 and the like and the rear pop-up mechanism constituted by the pop-up member 330 are set as follows.

The front pop-up mechanism raises the front end of the cassette 200 at the position shown in FIG. 3B. When the tray unit 100 is further pulled out from the position shown in FIG. 3B to the position shown in FIG. 3A, the rear pop-up mechanism raises the rear pop-up member 330. As described above, the operation of the pop-up mechanism is obtained by the guidance or collision of the respective parts upon movement of the tray unit 100. It is understood from this fact that the force to raise the cassette is obtained by the power of the motor 21 for driving the tray unit 100. Therefore, if both the front and rear pop-up mechanisms are simultaneously operated, a large load is applied on the motor 21. For this reason, a time difference is given between the operations of the front and rear pop-up mechanisms in this system (i.e., after the front pop-up mechanism raises the cassette, the rear pop-up mechanism raises the cassette). Consequently, the load on the motor 21 is reduced, and this enables driving by a low-power motor.

FIG. 4 is a perspective view schematically showing a state in which the tray unit 100 is pulled out most from the housing 10. As is apparent from FIG. 4, the pop-up members 230 and 330 are set such that their front pivotal ends face upward with respect to the horizontal cassette bottom support plates 240 and 401.

Although two cassette tapes can be loaded in this system as described above, some users selectively use a mode in which only the front portion is used and a mode in which only the back portion is used. For example, the front cassette is used for both recording and reproduction, whereas the rear cassette is used for reproduction only. In this case, it is necessary to load a cassette for reproduction purposes only in the back portion and a cassette which can be used in both recording and reproduction in the front portion. Possible loading errors in this case can be prevented by, for example, discriminating the cassette bottom support plate 240 in the front portion from the cassette bottom support plate 401 in the back portion by colors, e.g., blue and red. For example, a user himself or herself can make determinations that a cassette usable in recording is to be loaded in the blue mounting portion and a cassette for reproduction purposes only, which is not to be used in recording, is to be loaded in the red loading portion. Referring to FIG. 4, this discrimination is made by colors of the front and rear cassette bottom support plates. However, this discrimination by color may be made on the frame or may be made only partially. Alternatively, seals having marks on them may be adhered. The operation panel of the VTR main body has operation buttons such as recording Rec, playback Play, rewind, fast-forward, and stop buttons, and buttons constituting a tray mode designation section, for designating front cassette loading F and rear cassette loading R are also provided.

As an example, if the front cassette loading F is selected, the tray unit is moved to the second detection position in the housing 10, and a cassette is transported to the tape driving section by the pantagraph mechanism 201, as shown in FIG. 1C. When the rear cassette loading R is chosen, the tray unit is moved to the first detection position in the housing 10, and a cassette is transported to the tape driving section by the pantagraph mechanism 301, as shown in FIG. 1B.

FIGS. 5A and 5B show a state in which the cassette 300 in the back region is retracted when the cassette 200 in the front region is arranged in a predetermined loading position (tape driving section). This retraction is made by using the characteristic feature of this system in that the pantagraph mechanism 301 can further move the cassette 300 upward from its home position and can move it downward. When the cassette 300 is to be moved to the retraction position, the cassette 300 and the pantagraph mechanism 301 are lifted by the guide member 16 so as not to collide against the rotary head drum 15. Consequently, even when the height of the housing 10 is decreased for the sake of a low-profile apparatus, no collision occurs between the parts and the rotary head drum 15, and ventilation around the drum can be improved to decrease an increase in temperature. Also, the safety of cassette tapes can be improved.

In addition, an influence of the magnetism of the rotary head section on cassette tapes can be prevented by arranging a plate 61 with an aluminum foil in the bottom portion of the cassette bottom support plate 401 or above the rotary head drum 15. This further improves the safety of cassettes.

FIGS. 6A and 6B are views for explaining an extraction position control mechanism of the tray unit 100. FIG. 6A shows a state in which the tray unit 100 is maximally extracted from the housing 10 to make it possible to load cassettes in both the front and back regions (full-use mode). FIG. 6B shows a state in which the tray unit 100 is extracted halfway and a cassette can be loaded in only the front region (half-use mode). The use modes shown in FIGS. 6A and 6B can be designated in advance by the tray mode designation button TM. When the full-use mode is designated, the position detection unit for detecting the position of the tray unit 100 performs tray extraction end detection at the time the state of FIG. 6A is set. When the half-use mode is designated, the position detection unit for detecting the position of the tray unit 100 performs tray extraction end detection upon setting of the state shown in FIG. 6B.

Figure 7:
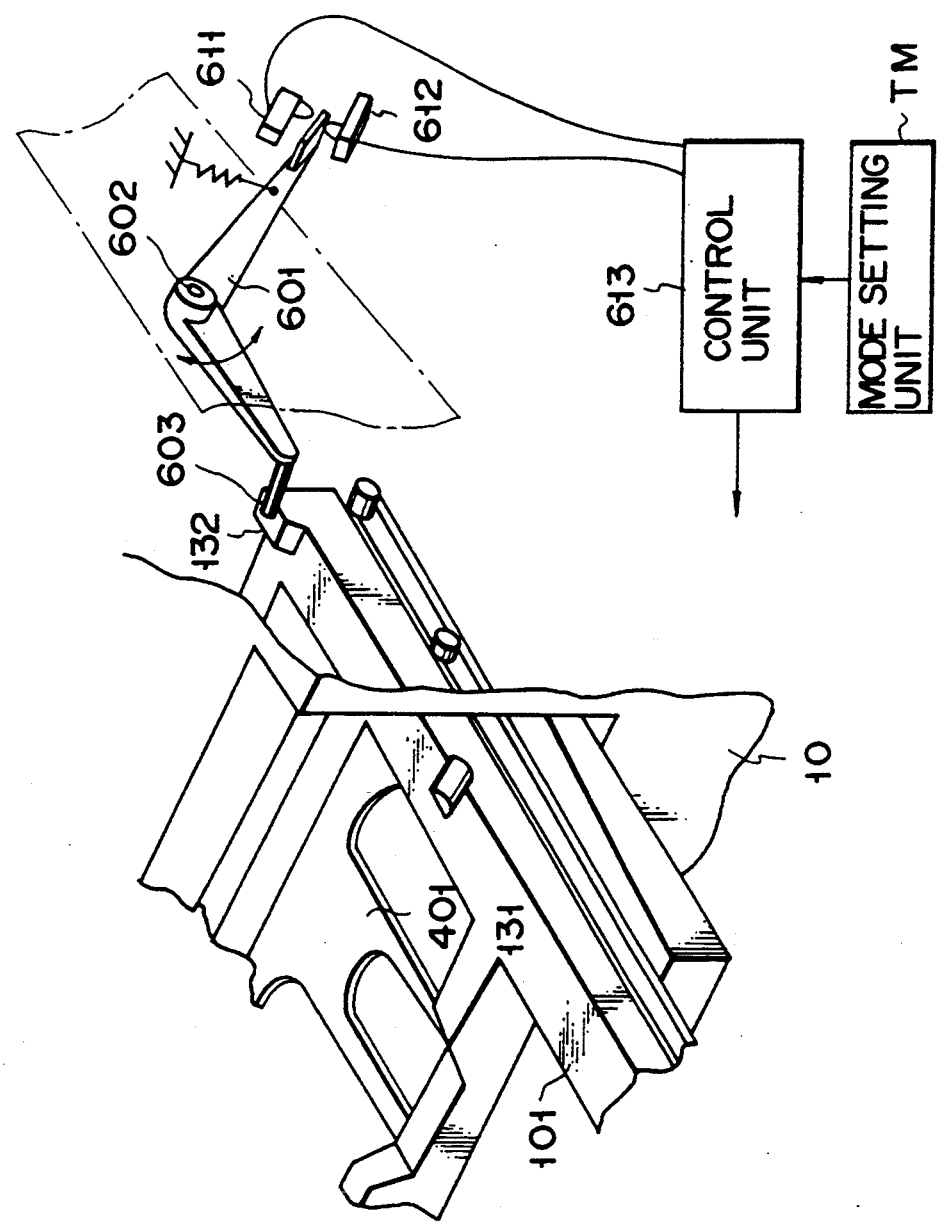
FIG. 7 is a view showing an example of a tray position detecting unit for obtaining the use state of the tray unit shown in FIGS. 6A and 6B.

FIG. 7 shows an example of the position detection unit. A tray extraction position detection lever 601 is an L-shaped member mounted to be vertically pivotal by a shaft 602 at a fixed position midway along the path through which the frame 101 of the tray unit 100 passes. A pin 603 is provided at one pivotal distal end portion of the position detection lever 601 and projects toward the top surface of side edge of the frame 101. The pin 603 can elastically abut against and slide on the upper surface of the edge of the frame 101. The other pivotal end portion of the position detection lever 601 is arranged between microswitches 611 and 612 aligned in the vertical direction as the pivoting direction. On the other hand, a recess portion 131 and a step portion 132 are formed at a predetermined interval therebetween on the edge surface (which corresponds to the pin 603) of the frame 101. Therefore, when the pin 603 enters the recess portion 131, the position detection lever 601 pivots counterclockwise about the shaft 602 to turn on the microswitch 611. When the pin 603 rides on the step portion 132, the position detection lever 601 pivots clockwise to turn on the microswitch 612. Referring to FIG. 7, the recess portion 131 is formed in the front portion and the step portion 132 is formed in the back portion. The state in which the pin 603 is in the recess 131 corresponds to the state shown in FIG. 6B, and the state in which the pin 603 is on the step portion 132 corresponds to the state shown in FIG. 6A.

When the full-use mode which uses a plurality of cassettes is designated, therefore, a detection signal from the microswitch 612 is used as a tray extraction end signal. When the half-use mode is designated, a detection signal from the microswitch 611 is used as the tray extraction end signal. The output signals from the microswitches 611 and 612 are supplied to a control unit 613 for controlling the entire system. Upon receiving an operation signal from an operation unit, the control unit 613 controls the functions of the respective units of the apparatus in accordance with preprogrammed procedures. Information from the tray mode designation switch TM is also supplied to the control unit 613. The control unit 613 determines the selection between detection signals in accordance with the information from that switch. Upon receiving the tray extraction end signal, the control unit 613 stops rotation of the motor 21 (FIGS. 1A to 1C) which constitutes the tray driving mechanism.

The arrangement may be made such that when the half-use mode is designated by the tray mode designation switch TM, the front cassette loading F is automatically performed without designating the cassette loading described above. The arrangement may also be made such that when the full-use mode is designated, the rear cassette loading R, for example, is performed preferentially.

As has been described above, according to the present invention, the operability can be improved especially when a plurality of cassette tapes are to be handled. In addition, since the total length of the tray unit can be minimized, it is possible to effectively decrease the size of the entire apparatus in the front-and-back direction.

What is claimed is:

1. An apparatus for handling a plurality of cassettes, comprising:
 a housing with an opening portion formed in a front wall, incorporating a recording and reproducing unit including a tape driving section;
 a carrying unit located inside said housing and on which said plurality of cassettes can be arranged when said carrying unit is projected from said opening portion;

a guide mechanism located inside said housing for continuously supporting said carrying unit so as to be horizontally movable;

a cassette driving unit for moving said carrying unit to selectively transport one cassette of said plurality of cassettes to a position corresponding to said tape driving section and transporting said one cassette of said plurality of cassettes to said tape driving section; and a guide member provided inside said housing, for lifting another cassette of said plurality of cassettes arranged on said carrying unit, when said carrying unit moves inward of said housing and approaches a rotary head drum, said guide member lifting said another cassette which is located furthest from said opening portion when said carrying unit is wholly situated inside said housing, thus preventing collision of said another cassette against said rotary head drum.

2. An apparatus for handling a plurality of cassettes, comprising:

a housing with an opening portion formed in a front wall, incorporating a recording and reproducing unit including a tape driving section;

a tray unit located inside said housing and on which said plurality of cassettes can be arranged when said tray unit is projected from said opening portion;

a guide mechanism located inside said housing for continuously supporting said tray unit so as to be horizontally movable;

a cassette driving unit for horizontally driving said tray unit to selectively transport one cassette of said plurality of cassettes between a position of said opening portion and a standby position in said housing, moving said tray unit to selectively transport said one cassette to a position corresponding to said tape driving section, and vertically driving said one of said plurality of cassettes between the position corresponding to said tape driving section and said tape driving section; and a guide member provided inside said housing, for lifting another cassette of said plurality of cassettes arranged on said tray unit, when said tray unit moves inward of said housing and approaches a rotary head drum, said guide member lifting said another cassette which is located furthest from said opening portion when said tray unit is wholly situated inside said housing, thus preventing collision of said another cassette against said rotary head drum.

3. An apparatus for handling a plurality of cassettes including first and second cassettes, comprising:

a housing with an opening portion formed in a front wall, having a tape recording and reproducing function;

a tray located inside said housing and in which the first and second cassettes can be arranged on top surfaces of front and back regions, respectively, when said tray is projected from the opening portion;

a guide mechanism located inside said housing for continuously supporting said tray so as to be horizontally movable;

a rear pop-up mechanism, arranged in the back region of said tray, for lifting a front end of said second cassette loaded in the back region to direct the front end toward an obliquely upper position when said tray is pulled and the entire front region and a portion of the back region are located outside said housing; and a guide member provided inside said housing, for lifting said second cassette of said plurality of cassettes arranged on said tray, when said tray moves inward of said housing and approaches a rotary head drum, said guide member lifting said second cassette which is located furthest from said opening portion when said tray is wholly situated inside said housing, thus preventing collision of said second cassette against said rotary head drum.

4. An apparatus for handling a plurality of cassettes including first and second cassettes, comprising:

a housing with an opening portion formed in a front wall, having a tape recording and reproducing function;

a tray located inside said housing and in which the first and second cassettes can be arranged on top surfaces of front and back regions, respectively, when said tray is projected from the opening portion;

a guide mechanism located inside said housing for continuously supporting said tray so as to be horizontally movable;

a rear pop-up mechanism, arranged in the back region of said tray, for lifting a front end of said second cassette loaded in the back region to direct the front end of the second cassette toward an obliquely upper position when said tray is pulled and the entire front region and a portion of the back region are located outside said housing; and a front pop-up mechanism, arranged in the front region of said tray, for lifting a front end of said first cassette located in the front region to direct the front end of the first cassette toward an obliquely upper position in an ejected state, wherein an inclination angle of said second cassette obtained by said rear pop-up mechanism is substantially equal to an inclination angle of said first cassette obtained by said front pop-up mechanism, and said first and second pop-up mechanisms are arranged such that said second cassette is housed in a cassette housing section of said rear pop-up mechanism with a bottom surface of the second cassette sliding on a top surface of said first cassette.

5. An apparatus for handling a plurality of cassettes, comprising:

a housing with an opening portion formed in a front wall, incorporating a recording and reproducing unit including a tape driving section;

a carrying unit located inside said housing and capable of holding said plurality of cassettes;

a guide mechanism located inside said housing for continuously supporting said carrying unit so as to be horizontally movable through said opening portion;

a cassette driving unit for driving the carrying unit to selectively move one cassette of said plurality of cassettes to a position corresponding to the tape driving section;

a space portion, formed between said opening portion and said tape driving section, for allowing movement of the carrying unit when the carrying unit is driven by the cassette driving unit in the housing; and a guide member provided inside said housing, for lifting another cassette of said plurality of cassettes arranged on said carrying unit, when said carrying unit moves inward of said housing and approaches a rotary head drum, said guide member lifting said another cassette which is located furthest from said opening portion when said carrying unit is wholly situated inside said housing, thus preventing collision of said another cassette against said rotary head drum.

6. An apparatus for handling a plurality of cassettes including first and second cassettes, comprising:
   a housing with an opening portion formed in a front wall, incorporating a recording and reproducing unit including a tape driving section;
   a carrying unit located inside said housing and having a first cassette housing section in which the first cassette is placed, and a second cassette housing section in which the second cassette is placed;
   a guide mechanism located inside said housing for continuously supporting said carrying unit such that said first cassette in the first cassette housing section and said second cassette in the second cassette housing section are inserted through the opening portion and transported into the housing;
   a carrying unit driving means for moving said carrying unit so as to either transport the first cassette placed in the first cassette housing section to a position corresponding to the tape driving section or transport the second cassette placed in the second cassette housing section to said position corresponding to the tape driving section;
   a cassette driving unit for transporting the first or second cassette, which is moved by said carrying unit driving means to a first or second position, to the tape driving section; and
   a guide member provided inside said housing, for lifting one cassette of said plurality of cassettes arranged on said carrying unit, when said carrying unit moves inward of said housing and approaches a rotary head drum, said guide member lifting said one cassette which is located furthest from said opening portion when said carrying unit is wholly situated inside said housing, thus preventing collision of said one cassette against said rotary head drum.

7. An apparatus for handling a plurality of cassettes including first and second cassettes, comprising:
   a housing with an opening portion formed in a front wall, incorporating a recording and reproducing unit including a tape driving section;
   a carrying unit having a first cassette housing section in which the first cassette is placed and a second cassette housing section in which the second cassette is placed;
   a carrying unit driving means for moving said carrying unit to one of first, second, third and fourth positions, said first position being a position where the first cassette can be loaded into the first cassette housing section through the opening portion, said second position being a position where the second cassette can be loaded into the second cassette housing section through the opening portion, said third position being a position which the first cassette corresponds in location to the tape driving section and said fourth position being a position where the second cassette corresponds in location to the tape driving section;
   a cassette driving unit for transporting the first or second cassette, which is moved by said carrying unit driving means to the third or fourth position, to said tape driving section; and
   a guide member provided inside said housing, for lifting one cassette of said plurality of cassettes arranged on said carrying unit, when said carrying unit moves inward of said housing and approaches a rotary head drum, said guide member lifting said one cassette which is located furthest from said opening portion when said carrying unit is wholly situated inside said housing, thus preventing collision of said one cassette against said rotary head drum.

8. An apparatus for handling a plurality of cassettes including first and second cassettes, comprising:
   a housing with an opening formed in a front wall, incorporating a recording and reproducing unit including a tape driving section;
   a carrying unit located inside said housing, said carrying unit having a first cassette housing section in which the first cassette is placed, and a second cassette housing section in which the second cassette is placed;
   a guide mechanism located inside said housing for continuously supporting said carrying unit; and
   carrying unit driving means for driving the carrying unit to one of first, second, third and fourth positions, said first position being a position where the carrying unit is projected from the opening, said second position being a position where the carrying unit is more projected from the opening than at the first position, said third position being a position where the first cassette is inside the housing and corresponds in location to the tape driving section, and said fourth position being a position where the second cassette is inside the housing and corresponds in location to the tape driving section;
   a cassette driving unit for moving the first or second cassette to the tape driving section when the carrying unit is moved to the third or fourth position; and
   a guide member provided inside said housing, for lifting one cassette of said plurality of cassettes arranged on said carrying unit, when said carrying unit moves inward of said housing and approaches a rotary head drum, said guide member lifting said one cassette which is located furthest from said opening when said carrying unit is wholly situated inside said housing, thus preventing collision of said one cassette against said rotary head drum.

9. An apparatus according to claim 8, wherein said third and fourth positions are spaced from each other by a distance which is substantially equal to a distance for which one of the first and second cassettes moves.

10. An apparatus for handling a plurality of cassettes including first and second cassettes, comprising:
    a housing with an opening formed in a front wall, incorporating a recording and reproducing unit including a tape driving section;
    a carrying unit located inside the housing, said carrying unit having a front cassette housing section in which the first cassette is placed and a rear cassette housing section in which the second cassette is placed;
    a guide mechanism located inside said housing for continuously supporting said carrying unit;
    carrying unit driving means for driving the carrying unit to one of first and second positions, said first position being a position where the carrying unit is projected from the opening, and said second position being a position where the carrying unit is more projected from the opening than at the first position;

mode selecting means for selecting one of first and second modes, said first mode being a mode wherein the carrying unit driving means is controlled such that the carrying unit is driven between the first position and a third position where the first cassette corresponds in location to the tape driving section, and said second mode being a mode wherein the carrying unit driving means is controlled such that the carrying unit is driven between the second position and a fourth position where the second cassette corresponds in location to the tape driving section;

a cassette driving unit for moving the first or second cassette to the tape driving section when the carrying unit is moved to the third or fourth position; and a guide member provided inside said housing, for lifting said second cassette of said plurality of cassettes arranged on said carrying unit, when said carrying unit moves inward of said housing and approaches a rotary head drum, said guide member lifting said second cassette which is located furthest from said opening when said carrying unit is wholly situated inside said housing, thus preventing collision of said second cassette against said rotary head drum.

11. An apparatus according to claim)3, wherein said first position is a position where only the first cassette can be placed in the front cassette housing section, and said second position is a position where both the first and second cassettes can be placed in the front and rear cassette housing sections, respectively.

12. An apparatus for handling a plurality of cassettes including first and second cassettes, comprising:

a housing with an opening formed in a front wall and having a tape recording and reproducing function;

a tray located inside the housing and in which the first and second cassettes can :be arranged on top surfaces of front and back regions, respectively, with said tray projected from the opening;

a guide mechanism located inside said housing for continuously supporting said tray so as to be horizontally movable;

a rear pop-up mechanism, arranged in the back region of said tray, for lifting a front end of said second cassette located on the back region to direct the front end toward an obliquely upper position, when said tray is in an ejected state where the entire front region and a portion of the back region are located outside said housing; and a front pop-up mechanism, arranged in the front region of said tray, for lifting a front end of said first cassette to direct the front end of said first cassette toward an obliquely upper position in the ejected state of the tray, wherein an inclination angle of said second cassette obtained by said rear pop-up mechanism is substantially equal to an inclination angle of said first cassette obtained by said front pop-up mechanism, and said first and second pop-up mechanisms are arranged such that said second cassette is housed in a cassette housing section of said rear pop-up mechanism with a bottom surface of said second cassette sliding on a top surface of said first cassette.

13. An apparatus according to claim 12, wherein a distal end of said rear pop-up mechanism can be pivoted toward an upper edge of said opening within an allowable range of said opening in an ejected state in order to facilitate removal of said second cassette.

14. An apparatus according to claim 12, wherein an extent to which the back region is exposed outside said housing is about half of a distance between front and rear edges of a cassette.

* * * * *